United States Patent
Zhou

(10) Patent No.: US 12,284,659 B2
(45) Date of Patent: Apr. 22, 2025

(54) METHOD FOR IDENTIFYING DOWNLINK CONTROL INFORMATION AND DEVICE

(71) Applicant: BEIJING UNISOC COMMUNICATIONS TECHNOLOGY CO., LTD, Beijing (CN)

(72) Inventor: Huan Zhou, Beijing (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 305 days.

(21) Appl. No.: 17/904,200

(22) PCT Filed: Jan. 29, 2021

(86) PCT No.: PCT/CN2021/074304
§ 371 (c)(1),
(2) Date: Aug. 12, 2022

(87) PCT Pub. No.: WO2021/159969
PCT Pub. Date: Aug. 19, 2021

(65) Prior Publication Data
US 2023/0083882 A1    Mar. 16, 2023

(30) Foreign Application Priority Data

Feb. 12, 2020   (CN) .................. 202010088570.6

(51) Int. Cl.
*H04W 72/23* (2023.01)
*H04L 5/00* (2006.01)
(52) U.S. Cl.
CPC .......... *H04W 72/23* (2023.01); *H04L 5/0053* (2013.01); *H04L 5/0094* (2013.01)

(58) Field of Classification Search
CPC ............. H04W 72/23; H04W 72/0453; H04W 72/232; H04L 5/0053; H04L 5/0094; H04L 5/001
See application file for complete search history.

(56) References Cited

U.S. PATENT DOCUMENTS

2012/0250643 A1* 10/2012 He .................. H04L 5/001
                                                            370/329
2012/0302173 A1   11/2012 Bostrom et al.
(Continued)

FOREIGN PATENT DOCUMENTS

CN    102104922 A    6/2011
CN    102202415 A    9/2011
(Continued)

OTHER PUBLICATIONS

The Office Action issued by the Japanese Patent Office for the Japanese Patent Application No. 2022-549202 mailed on Aug. 7, 2023.
(Continued)

*Primary Examiner* — Dady Chery
(74) *Attorney, Agent, or Firm* — MASCHOFF BRENNAN; Paul G. Johnson

(57) ABSTRACT

Embodiments of the present disclosure provide a method for identifying downlink control information, a user equipment (UE) and a non-transitory computer-readable storage medium. The UE determines target indication information corresponding to DCI sent by a network device, and determines, according to configuration information corresponding to respective serving cells to be scheduled and the target indication information, a target serving cell scheduled by the DCI.

4 Claims, 4 Drawing Sheets

(56) References Cited

U.S. PATENT DOCUMENTS

| | | | |
|---|---|---|---|
| 2013/0155969 A1 | 6/2013 | Moon et al. | |
| 2016/0302176 A1 | 10/2016 | Ahn et al. | |
| 2017/0195999 A1 | 7/2017 | Feng et al. | |
| 2018/0115965 A1 | 4/2018 | Takeda et al. | |
| 2020/0022087 A1* | 1/2020 | Dou ..................... | H04W 52/40 |
| 2020/0029338 A1 | 1/2020 | Lee et al. | |
| 2020/0205082 A1* | 6/2020 | Chen .................... | H04L 5/0094 |
| 2021/0204276 A1* | 7/2021 | Ge ........................ | H04L 1/1861 |
| 2021/0400592 A1* | 12/2021 | Dou .................... | H04W 52/367 |

FOREIGN PATENT DOCUMENTS

| | | | |
|---|---|---|---|
| CN | 103812625 A | 5/2014 | |
| CN | 105792363 A | 7/2016 | |
| CN | 105991263 A | 10/2016 | |
| CN | 105991269 A | 10/2016 | |
| CN | 111294960 A | 6/2020 | |
| JP | 2017538318 A | 12/2017 | |
| JP | 2018506246 A | 3/2018 | |
| KR | 10-2017-0095275 A | 8/2017 | |
| WO | 2013168561 A1 | 11/2013 | |
| WO | 2016/072036 A1 | 5/2016 | |
| WO | 2016163503 A1 | 10/2016 | |

OTHER PUBLICATIONS

The Extended European Search Report by the EPO for the European Patent Application No. 21752923.9 issued on Jun. 12, 2023.

International Search Report and Written Opinion of the International Searching Authority for PCT/CN2021/074304, mailed on Apr. 21, 2021 (English translation also attached).

The first Office Action for the corresponding Chinese Patent Application No. 202010088570.6, issued on Jul. 6, 2022, with English translation.

Korean Office Action, as issued in connection with Korean Application No. 10-2022-7031284, dated Dec. 23, 2024, 10 pgs.

* cited by examiner

METHOD FOR IDENTIFYING DOWNLINK CONTROL INFORMATION AND DEVICE

CROSS-REFERENCE TO RELATED APPLICATIONS

This Application is a National Stage of International Application No. PCT/CN2021/074304, filed on Jan. 29, 2021, which claims priority to Chinese Application No. 202010088570.6, filed with the China National Intellectual Property Administration on Feb. 12, 2020 and titled "METHOD FOR IDENTIFYING DOWNLINK CONTROL INFORMATION AND DEVICE". Both of the applications are incorporated by reference herein.

TECHNICAL FIELD

Embodiments of the present disclosure relate to the field of communication technologies, and in particular, to a method for identifying downlink control information (DCI) and device.

BACKGROUND

In a new radio (NR) system, DCI usually includes resource assignment information, which is used to notify a resource location of a serving cell used by a user equipment (UE).

The NR system supports a carrier aggregation (CA) technology. In a carrier aggregation scenario, the user equipment UE can configure a primary cell (PCell) and multiple secondary cells (SCell), and the network device uses the DCI to indicate the serving cell to be scheduled by the UE. The NR system supports that one piece of DCI includes scheduling information of multiple serving cells simultaneously, so as to schedule multiple serving cells simultaneously.

However, it remains to be resolved that how to accurately identify the specific serving cell scheduled by the DCI when the DCI includes scheduling information of multiple serving cells.

SUMMARY

The embodiments of the present disclosure provide a method for identifying downlink control information and a device, which can solve the technical problem in the related art that when the DCI includes scheduling information of multiple serving cells, the specific serving cell scheduled by the DCI cannot be accurately identified.

In a first aspect, an embodiment of the present disclosure provides a method for identifying downlink control information, which is applied to a UE, and the method includes:
determining target indication information corresponding to DCI sent by a network device; and
determining, according to configuration information corresponding to respective serving cells to be scheduled and the target indication information, a target serving cell scheduled by the DCI.

In a second aspect, an embodiment of the present disclosure provides a user equipment, including: at least one processor and a memory;
the memory stores computer-executable instructions;
the at least one processor executes the computer-executable instructions stored in the memory, enabling the user equipment to execute the method for identifying the downlink control information as provided in the first aspect.

In a third aspect, an embodiment of the present disclosure provides a computer-readable storage medium, where computer-executable instructions are stored in the computer-readable storage medium, and when a processor executes the computer-executable instructions, the method for identifying the downlink control information as provided in the first aspect is implemented.

The embodiments of the present disclosure provide a method for identifying downlink control information and device, a UE determines target indication information corresponding to DCI sent by a network device, and determines, according to configuration information corresponding to respective serving cells to be scheduled and the target indication information, a target serving cell scheduled by the DCI.

That is, in the embodiments of the present disclosure, when identifying the specific serving cell scheduled by the DCI, the UE may determine, according to the target indication information corresponding to the DCI and the configuration information corresponding to the respective serving cells to be scheduled, the target serving cell scheduled by the DCI.

BRIEF DESCRIPTION OF DRAWINGS

In order to more clearly illustrate the embodiments of the present disclosure or the technical solutions in the related art, the following will briefly introduce the accompanying drawings that need to be used in the description of the embodiments or the related art. Obviously, the accompanying drawings in the following description are some embodiments of the present disclosure, and for those of ordinary skill in the art, other drawings can also be obtained from these drawings without any creative effort.

DESCRIPTION OF EMBODIMENTS

In order to make the purposes, technical solutions and advantages of the embodiments of the present disclosure clearer, the technical solutions in the embodiments of the present disclosure will be described clearly and completely below with reference to the drawings in the embodiments of the present disclosure. Obviously, the described embodiments are a part of the embodiments of the present disclosure, but not all of the embodiments. Based on the embodiments in the present disclosure, all other embodiments obtained by those of ordinary skill in the art without creative efforts shall fall within the protection scope of the present disclosure.

The embodiments of the present disclosure can be applied to various communication systems, for example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, a NR-based access to unlicensed spectrum (NR-U) system, a universal mobile telecommunication system (UMTS), wireless local area networks (WLAN), wireless fidelity (WiFi), next-generation communication systems or other communication systems, etc.

Generally speaking, traditional communication systems support a limited number of connections and are easy to implement. However, with the development of communication technologies, mobile communication systems will not only support traditional communication, but also support, for example, device to device (D2D) communication, machine to machine (M2M) communication, machine type communication (MTC), and vehicle to vehicle (V2V) communication, etc. The embodiments of the present disclosure can also be applied to these communication systems.

In an embodiment, the communication system in the embodiments of the present disclosure may be applied to a carrier aggregation (CA) scenario, a dual connectivity (DC) scenario, or a standalone (SA) network layout scenario.

The embodiments of the present disclosure do not limit the applied spectrum. For example, the embodiments of the present disclosure may be applied to licensed spectrum, and may also be applied to unlicensed spectrum.

Figure 1:
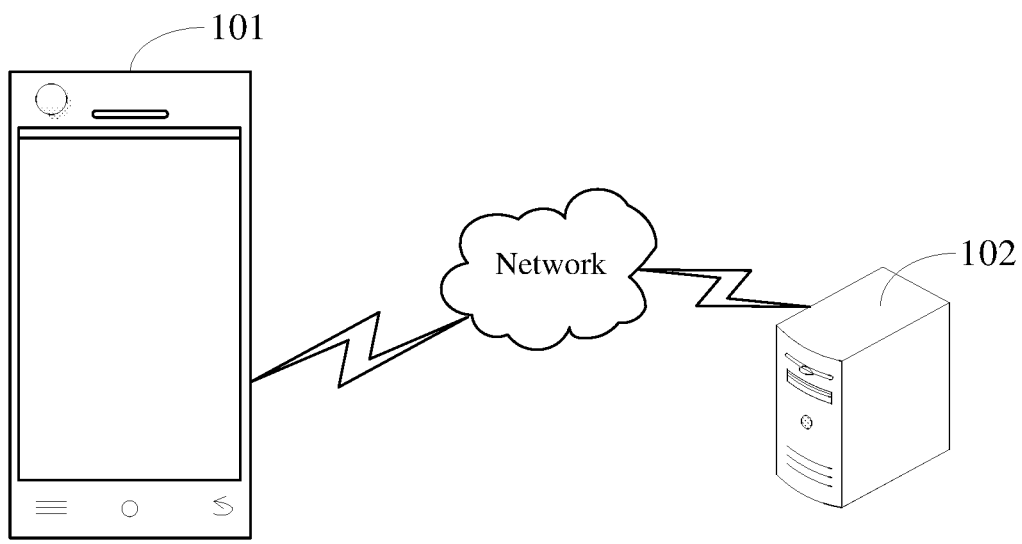
FIG. 1 is a schematic structural diagram of a wireless communication system provided in an embodiment of the present disclosure.

Referring to FIG. 1, which is a schematic structural diagram of a wireless communication system according to an embodiment of the present disclosure. The wireless communication system provided in this embodiment includes a UE 101 and a network device 102.

In an embodiment, UE 101 may refer to various forms of a user equipment, an access terminal, a subscriber unit, a subscriber station, a mobile station (MS), a remote station, a remote terminal, a mobile device, a terminal equipment, a wireless communication equipment, a user agent or a user equipment. It can also be a cellular phone, a cordless phone, a session initiation protocol (SIP) phone, a wireless local loop (WLL) station, a personal digital assistant (PDA), a handheld device with wireless communication function, a computing device or other processing devices connected to wireless modems, an in-vehicle device, a wearable device, a terminal device in future 5G networks or in future evolved public land mobile networks (PLMN), which is not limited in the embodiments of the present disclosure, as long as the UE 101 can communicate with the network device 102 wirelessly.

The embodiments of the disclosure define the unidirectional communication link from the access network to the UE as the downlink, the data transmitted on the downlink is the downlink data, and the transmission direction of the downlink data is called the downlink direction; while the unidirectional communication link from the UE to the access network is defined as the uplink, the data transmitted on the uplink is the uplink data, and the transmission direction of the uplink data is called the uplink direction.

In an embodiment, the network device 102 is a public mobile communication network device, which is an interface device for the UE 101 to access the Internet, and is also a form of a radio station. A radio transceiver station, including a base station (BS), also known as base station equipment, is a device deployed in a radio access network (RAN) to provide wireless communication functions. For example, the equipment that provides base station functions in 2G networks includes base transceiver stations (BTS), the equipment that provides base station functions in 3G networks includes a NodeB (NodeB), and the equipment that provides base station functions in 4G networks includes an evolved NodeB (eNB), in the wireless local area networks (WLAN), the device that provides the base station function is an access point (AP), and in 5G NR, the device that provides the base station function is a gNB, and a next generation evolved NodeB (ng-eNB), where the NR technology is used for communication between the gNB and the UE, and the evolved universal terrestrial radio access (E-UTRA) is used for communication between the ng-eNB and the UE. Both the gNB and the ng-eNB can connect to the 5G core network. The network device 102 in the embodiments of the present disclosure also includes a device that provides a base station function in a new communication system in the future, and the like.

In a feasible implementation manner, the network device may send uplink scheduling information (UL Grant) to the UE through downlink control information (DCI), indicating uplink physical uplink shared channel (PUSCH) transmission, so that the UE can send data.

In an embodiment, the UL grant may include the following information: resource assignment information (Resource block assignment and hopping resource allocation); modulation and coding scheme and redundancy version information: used to specify the modulation and coding Scheme (MCS) and redundancy version (RV) of the corresponding PUSCH transmission, and used to determine the transport block size (TB size);

a new data indicator: used to determine whether the current transmission is a new transmission or a retransmission;

a TPC command for scheduling PUSCH: power control for PUSCH;

a HARQ process number: used to specify the HARQ process corresponding to the current transmission.

In addition, for uplink transmission, there are usually two types of configured/semi-persistent grant resource (configured grant resource) configuration manners:

configured grant manner 1: configuring through radio resource control (RRC) layer signaling (IE Configured Grant Config).

Configured grant manner 2: the DCI indicates the activation and deactivation of uplink pre-configured/semi-persistent resources, a part of the required configuration parameters are configured by IE Configured Grant Config, but it needs to be activated by the DCI before it can be used.

In an embodiment, the embodiments of the present disclosure may be applied to various periodic services, and the network device may adopt a semi-persistent scheduling (SPS) or a configured grant (CG) manner to configure periodic transmission resources for the UE.

In an embodiment, the embodiments of the present disclosure may also be applied to aperiodic services.

In a communication system that introduced the carrier aggregation, the aggregated carrier is called a component carrier (CC), also called a serving cell, including a primary component carrier/cell (PCC/PCell) and secondary component carrier/cell (SCC/SCell). In a communication system where carrier aggregation is performed, at least one primary cell and a secondary cell are included, where the primary cell is always in an active state.

Currently, the UE can configure one primary cell PCell and multiple secondary serving cells SCell, and the network device indicates the serving cell to be scheduled by the UE through the DCI. One piece of DCI may include scheduling information of a certain serving cell, or may simultaneously include scheduling information of multiple serving cells. However, in the related art, after receiving the DCI, it is difficult for the UE to accurately identify that the DCI includes the scheduling information of only one serving cell or the scheduling information of multiple serving cells, so when the DCI includes the scheduling information of multiple serving cells, the UE cannot determine scheduling information of which serving cells is included in the DCI.

In order to solve the above technical problem, an embodiment of the present disclosure provides a method for identifying downlink control information. When identifying a specific serving cell scheduled by DCI, the UE can determine, based on the target indication information corresponding to the DCI and configuration information corresponding to respective serving cells to be scheduled, the target serving cell scheduled by DCI. Even when the DCI includes scheduling information of multiple serving cells, the UE can accurately identify multiple target serving cells scheduled by the DCI. Please refer to the following examples of this disclosure for details.

Figure 2:
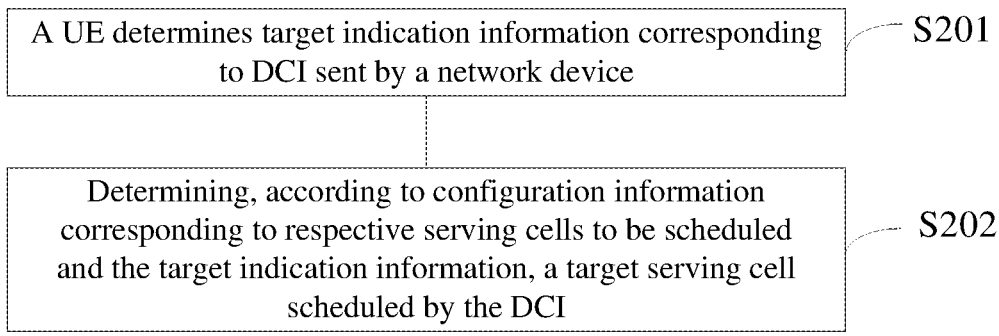
FIG. 2 is a first schematic flowchart of a method for identifying downlink control information provided in an embodiment of the present disclosure.

Referring to FIG. 2, FIG. 2 is a first schematic flowchart of a method for identifying downlink control information provided by an embodiment of the present disclosure. The execution body of this embodiment is the UE in the embodiment shown in FIG. 1. As shown in FIG. 2, the method includes:

S201, determining target indication information corresponding to DCI sent by a network device.

In an embodiment of the present disclosure, cross-carrier scheduling can be implemented, that is, a physical downlink control channel (PDCCH) on a certain serving cell can schedule physical downlink shared channels (PDSCH)/physical uplink shared channel (PUSCH) of multiple serving cells. The serving cell where the PDCCH is located is called the serving cell scheduled by the carrier, and the serving cell where the PDSCH/PUSCH is located is called the scheduled serving cell.

In an embodiment of the present disclosure, before sending the DCI to the UE, the network device may first configure the serving cell to be scheduled that can be scheduled by the UE through the radio resource control (RRC) upper layer signaling, and then target indication information is configured in the DCI, and the target indication information is used to indicate the target serving cell scheduled by the UE. Exemplarily, the target indication information may be a carrier indicator field (CIF) value, a bitmap value, a search space identifier (search space ID), and the like.

In an embodiment, the above-mentioned DCI may be used to schedule one serving cell, or may simultaneously schedule multiple serving cells.

S202, determining, according to configuration information corresponding to respective serving cells to be scheduled and the target indication information, the target serving cell scheduled by the DCI.

After the UE determines the configuration information corresponding to the above target indication information, it can find out, according to the target indication information and the configuration information corresponding to the respective serving cells to be scheduled, the target serving cell indicated by the above target indication information, and then send or receive data in the corresponding target serving cell according to the scheduling information carried in the DCI.

For example, assuming that the above target indication information is the CIF value, search the mapping relationship between the set of CIF value in the configuration information and the serving cell to obtain the serving cell that matches the CIF value in the target indication information. If the matching serving cell is Scell 1 and Scell 2, then it can be determined that the target serving cells scheduled by the DCI are Scell 1 and Scell 2; if the matching serving cell is Pcell, it can be determined that the target serving cell scheduled by the DCI is Pcell.

For another example, assuming that the above-mentioned target indication information is a bitmap value, the target serving cell scheduled by the above-mentioned DCI can be determined according to the bitmap value and the bitmap information corresponding to the respective cells to be scheduled in the configuration information, for example, the matching serving cell is Scell 1 and Scell 2, or Pcell.

That is, in the method for identifying downlink control information provided by an embodiment of the present disclosure, when identifying the specific serving cell scheduled by the DCI, the UE can determine, according to the target indication information corresponding to the DCI and the configuration information corresponding to the respective serving cells to be scheduled, the target serving cell scheduled by the DCI. Therefore, even when the DCI includes scheduling information of multiple serving cells, the UE can accurately identify the multiple target serving cells scheduled by the DCI.

It can be understood that, after identifying the target serving cell scheduled by the DCI, the UE can determine whether the above-mentioned DCI includes only the resource scheduling information corresponding to one serving cell to be scheduled, or whether the above-mentioned DCI includes resource scheduling information corresponding to two or more serving cells to be scheduled. For example, when the number of the determined target serving cells is two or more, it can be determined that the DCI includes resource scheduling information corresponding to two or more serving cells to be scheduled, and when the number of the determined target serving cells is only one, it can be determined that the DCI includes only the resource scheduling information of one serving cell to be scheduled.

Figure 3:
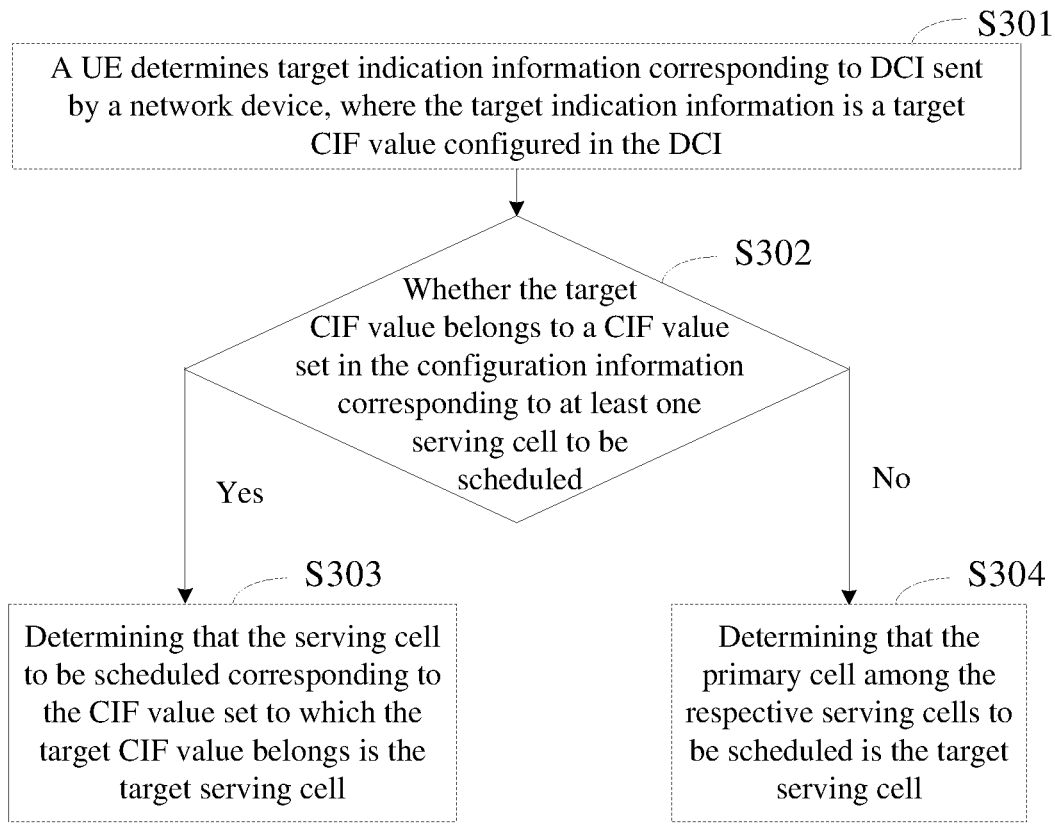
FIG. 3 is a second schematic flowchart of a method for identifying downlink control information provided in an embodiment of the present disclosure.

Based on the content described in the foregoing embodiments, referring to FIG. 3, which is a second schematic flowchart of a method for identifying downlink control information provided by an embodiment of the present disclosure. In a feasible embodiment of the present disclosure, the above-mentioned method for identifying the downlink control information includes:

S301, a UE determines target indication information corresponding to DCI sent by a network device, where the target indication information is a target CIF value configured in the DCI.

In an embodiment of the present disclosure, several CIF values may be configured in the upper layer parameter Cross Carrier Scheduling Config of the respective serving cells to be scheduled, and then the corresponding target CIF value is also configured in the DCI. After receiving the DCI including the target CIF value, the UE can send or receive data on the corresponding serving cell according to the value of the target CIF.

S302, the UE determines whether the target CIF value belongs to a corresponding CIF value set in the configuration information corresponding to at least one serving cell to be scheduled among the respective serving cells to be scheduled; if it belongs, execute S303; if not, execute S304.

S303, based on that the target CIF value belongs to the CIF value set corresponding to at least one serving cell to be scheduled among the respective serving cells to be scheduled, the UE determines that the serving cell to be scheduled corresponding to the CIF value set to which the target CIF value belongs is the target serving cell, ending the procedure.

S304, based on that the target CIF value does not belong to the CIF value set corresponding to the respective serving cells to be scheduled, the UE determines that the primary cell among the respective serving cells to be scheduled is the target serving cell, ending the procedure.

Exemplarily, multiple CIF values are configured in the upper layer parameter Cross Carrier Scheduling Config of respective scheduled serving cells. For example, the first CIF value indicates that only one serving cell is scheduled, and other CIF values except the first CIF value indicate that multiple serving cells can be scheduled.

Meanwhile, for the serving cell scheduled by the carrier, multiple CIF values can also be configured, and all CIF values indicate that multiple serving cells can be scheduled.

In addition, when the target CIF value configured in the DCI carried on the PDCCH of the serving cell scheduled by the current carrier is 0 or is not configured in the respective scheduled serving cells, it can be considered that the serving cell scheduled by the current carrier is the target serving cell scheduled by the DCI, or the primary cell among the respective serving cells to be scheduled is the above-mentioned target serving cell.

For example, assuming that Pcell is the serving cell scheduled by the carrier, the configured CIF value set is {6, 5}; Scell 1 is the serving cell scheduled across cells, and the configured CIF value set is {2, 7, 6}; Scell 2 is the serving cell scheduled across cells, the configured CIF value set is {3, 7, 5}.

When the target CIF value configured in the above DCI is 2, it means that only Scell 1 is scheduled. When the above target CIF value is 3, it means that only Scell 2 is scheduled.

When the above target CIF value is 0, it means that only Pcell is scheduled. When the above target CIF value is 5, it means that two cells Pcell+scell 2 are scheduled. When the above-mentioned target CIF value is 7, it means that two cells Scell 1+Scell 2 are scheduled. When the above-mentioned target CIF value is 6, it means that two cells Pcell+Scell 1 are scheduled.

That is, in the method for identifying the downlink control information provided by an embodiment of the present disclosure, the UE can accurately identify, based on the target CIF value corresponding to the DCI and the CIF value set corresponding to the respective serving cells to be scheduled, the target serving cell scheduled by the DCI.

Based on the content described in the above embodiment, in another feasible implementation manner of the present disclosure, the configuration information corresponding to the respective serving cells to be scheduled is the correspondence between respective CIF values and the respective serving cells to be scheduled. The indication information is the target CIF value configured in the above DCI. After the above S301, another specific implementation method for determining, according to the configuration information corresponding to the respective serving cells to be scheduled and the target indication information, the target serving cell scheduled by the DCI is:

searching the correspondence between the respective CIF values and the respective serving cells to be scheduled, and determining a serving cell to be scheduled corresponding to the target CIF value as the target serving cell.

In an embodiment, in an embodiment of the present disclosure, a serving cell scheduling table may be configured in the serving cell scheduled by the carrier through upper layer signaling, and each CIF value may indicate a combination of different ServCellIndex. The above ServCellIndex may uniquely indicate a certain serving cell.

For a better understanding of the embodiments of the present disclosure, refer to Table 1, which is a table of the correspondence between the respective CIF values and the identifiers of the respective serving cells to be scheduled:

TABLE 1

Correspondence table between the respective CIF values and the identifiers of the respective serving cells to be scheduled

| CIF value | Serving cell to be scheduled 1 | Serving cell to be scheduled 2 |
|---|---|---|
| 0 | ServCellIndex1 | — |
| 1 | ServCellIndex1 | ServCellIndex 3 |
| 2 | ServCellIndex 2 | ServCellIndex 5 |

Exemplarily, assuming that Pcell is the serving cell scheduled by the carrier, the configuration information corresponding to the respective serving cells to be scheduled is shown in Table 2, and Table 2 is the correspondence table between the respective CIF values and the respective serving cells to be scheduled:

TABLE 2

Correspondence table between the respective CIF values and respective serving cells to be scheduled

| CIF value | Serving cell to be scheduled 1 | Serving cell to be scheduled 2 |
|---|---|---|
| 0 | Pcell | — |
| 1 | Pcell | SCell 1 |
| 2 | Pcell | SCell 2 |
| 3 | SCell 1 | SCell 3 |

When the above target CIF value is 0, it means that only Pcell is scheduled. When the target CIF value configured in the above DCI is 1, it means that two cells Pcell+Scell 1 are scheduled. When the target CIF value configured in the above DCI is 2, it means that two cells Pcell+Scell 2 are scheduled. When the target CIF value configured in the above DCI is 3, it means that two cells SCell 1+Scell 3 are scheduled.

That is, in the method for identifying the downlink control information provided by the embodiment of the present disclosure, the UE can accurately identify, based on the target CIF value corresponding to the DCI and the correspondence table between the respective CIF values and the respective serving cells to be scheduled, the target serving cell scheduled by the DCI.

Based on the content described in the foregoing embodiment, in another feasible implementation manner of the present disclosure, the configuration information corresponding to the respective serving cells to be scheduled is the bitmap information corresponding to the respective serving cells to be scheduled, and the target indication information is the bitmap value corresponding to the bitmap information, and one bit in the bitmap value corresponds to one serving cell to be scheduled among the respective serving cells to be scheduled, after the above S301, another implementation manner of determining, according to the configuration information corresponding to the respective serving cells to be scheduled and the target indication information, the target serving cell scheduled by the DCI is:

determining a serving cell to be scheduled corresponding to a bit with a value of 1 in the bitmap value as the target serving cell.

In an embodiment, in an embodiment of the present disclosure, a bitmap (Bitmap) value may be carried in the DCI to indicate which serving cell or which serving cells are scheduled. The number of bits in the bitmap value depends on the total number of used serving cells to be scheduled. In an embodiment, the least significant bit (LSB) in the bitmap value represents the serving cell scheduled by the carrier, and other bits represent the remaining serving cells in ascending order of ServCellIndex; or, the most significant bit (MSB) in the bitmap value represents the serving cell scheduled by the carrier, and other bits represent the remaining serving cells in descending order of ServCellIndex.

For example, assuming the above bitmap value is 1000, it means that there are four serving cells to be scheduled, from the leftmost bit to the rightmost bit, representing Pcell, Scell 1, Scell 2, and Scell 3 in turn.

The serving cell to be scheduled corresponding to a bit with a value of 1 in the above bitmap value is a scheduled serving cell, and the serving cell to be scheduled corresponding to a bit with a value of 0 is an unscheduled serving cell.

Exemplarily, assuming that there are four serving cells to be scheduled, namely Pcell, Scell 1, Scell 2, and Scell 3, a bitmap value with 4 bits is configured in the DCI. When the bitmap value is 1010, it means that two cells Pcell+Scell 2 are scheduled. When the bitmap value is 1000, it means that only Pcell is scheduled.

That is, in the method for identifying the downlink control information provided by the embodiment of the present disclosure, the UE can accurately identify, based on the bitmap value in the DCI and the bitmap information corresponding to the respective serving cells to be scheduled, the target serving cell scheduled by the DCI.

Based on the content described in the foregoing embodiment, in another feasible implementation manner of the present disclosure, the configuration information corresponding to the respective serving cells to be scheduled is a search space list corresponding to the respective serving cells to be scheduled, and the above-mentioned target indication information is a corresponding target search space identifier when the UE receives the DCI. After the above S301, another implementation manner of the determining, according to the configuration information corresponding to the respective serving cells to be scheduled and the target indication information, the target serving cell scheduled by the DCI is:

determining a serving cell to be scheduled corresponding to a search space list to which the target search space identifier belongs as the target serving cell.

For example, if the target search space identifier (search space ID) received the above-mentioned DCI belongs to the search space list corresponding to serving cell 1 and also belongs to the search space list corresponding to serving cell 2. Then the above-mentioned DCI can schedule the serving cell 1 and the serving cell 2 at the same time; if the target search space identifier that received the above-mentioned DCI only belongs to the search space list corresponding to the serving cell 1 and does not belong to the search space list corresponding to the serving cell 2, then the above DCI can only schedule serving cell 1 among the two cells.

In an embodiment, in a feasible implementation manner of the present disclosure, the target indication information further includes the target CIF value configured in the DCI. After the above-mentioned S301, another implementation manner of the determining, according to the configuration information corresponding to the respective serving cells to be scheduled and the target indication information, the target serving cell scheduled by DCI is:

determining a serving cell to be scheduled associated with the target CIF value; based on that the target CIF value is associated with one serving cell to be scheduled, determining the serving cell to be scheduled associated with the target CIF value as the target serving cell; based on that the target CIF value is associated with two or more serving cells to be scheduled, determining the serving cell to be scheduled corresponding to the search space list to which the target search space identifier belongs as the target serving cell.

Exemplarily, assuming that the Pcell is the serving cell scheduled by the carrier, and the search space list configured in its current bandwidth part (Bandwidth Part, BWP for short) is {SS1, SS2, SS3}; Scell 1 is a scheduled across serving cell, and the search space list configured in its current BWP is {SS1}; Scell 2 is a scheduled across serving cell, and the search space list configured in its current BWP is {SS2}.

Then when the UE receives the above-mentioned DCI at SS1, which indicates that the above-mentioned DCI can schedule two serving cells Pcell+Scell 1; when the UE receives the above-mentioned DCI at SS2, which indicates that the above-mentioned DCI can schedule two serving cells Pcell+Scell 2; when the UE receives the above-mentioned DCI at SS3, which indicates that the above-mentioned DCI can only schedule one serving cell Pcell.

That is, in the method for identifying the downlink control information provided by the embodiment of the present disclosure, the UE can accurately identify, based on the corresponding target search space identifier when the UE receives the DCI and the search space list corresponding to the respective serving cells to be scheduled, the target serving cell scheduled by the DCI.

Figure 4:
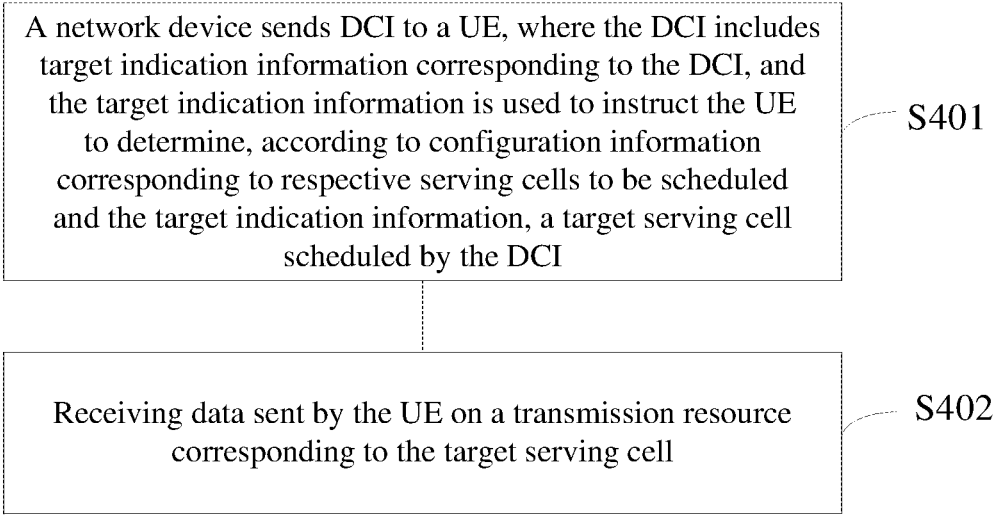
FIG. 4 is a third schematic flowchart of a method for identifying downlink control information provided in an embodiment of the present disclosure.

Further, based on the content described in the above-mentioned embodiments, the present disclosure further provides a method for identifying the downlink control information, and the method is applied to a network device. Referring to FIG. 4, FIG. 4 is a third schematic flow chart of the method for identifying downlink control information provided by an embodiment of the present disclosure, the above method includes:

S401, sending DCI to a UE, where the DCI includes target indication information corresponding to the DCI, and the target indication information is used to instruct the UE to determine, according to configuration information corresponding to respective serving cells to be scheduled and the target indication information, a target serving cell scheduled by the DCI.

S402, receiving data sent by the UE on a transmission resource corresponding to the target serving cell.

In an embodiment of the present disclosure, the DCI sent by the network device to the UE includes the target indication information, and when the UE identifies the specific serving cell scheduled by the received DCI, the UE can determine, according to configuration information corresponding to the respective serving cells to be scheduled and the target indication information, the target serving cell scheduled by the DCI. Therefore, even when the DCI includes scheduling information of multiple serving cells, the UE can accurately identify the multiple target serving cells scheduled by the DCI. For the specific implementation principle, reference may be made to the descriptions of the various embodiments in the above-mentioned method for identifying the downlink control information applied to the UE, which will not be repeated here.

In a feasible embodiment, before sending the DCI to the UE, the network device further includes: sending the configuration information corresponding to the respective serving cells to be scheduled to the UE.

Figure 5:
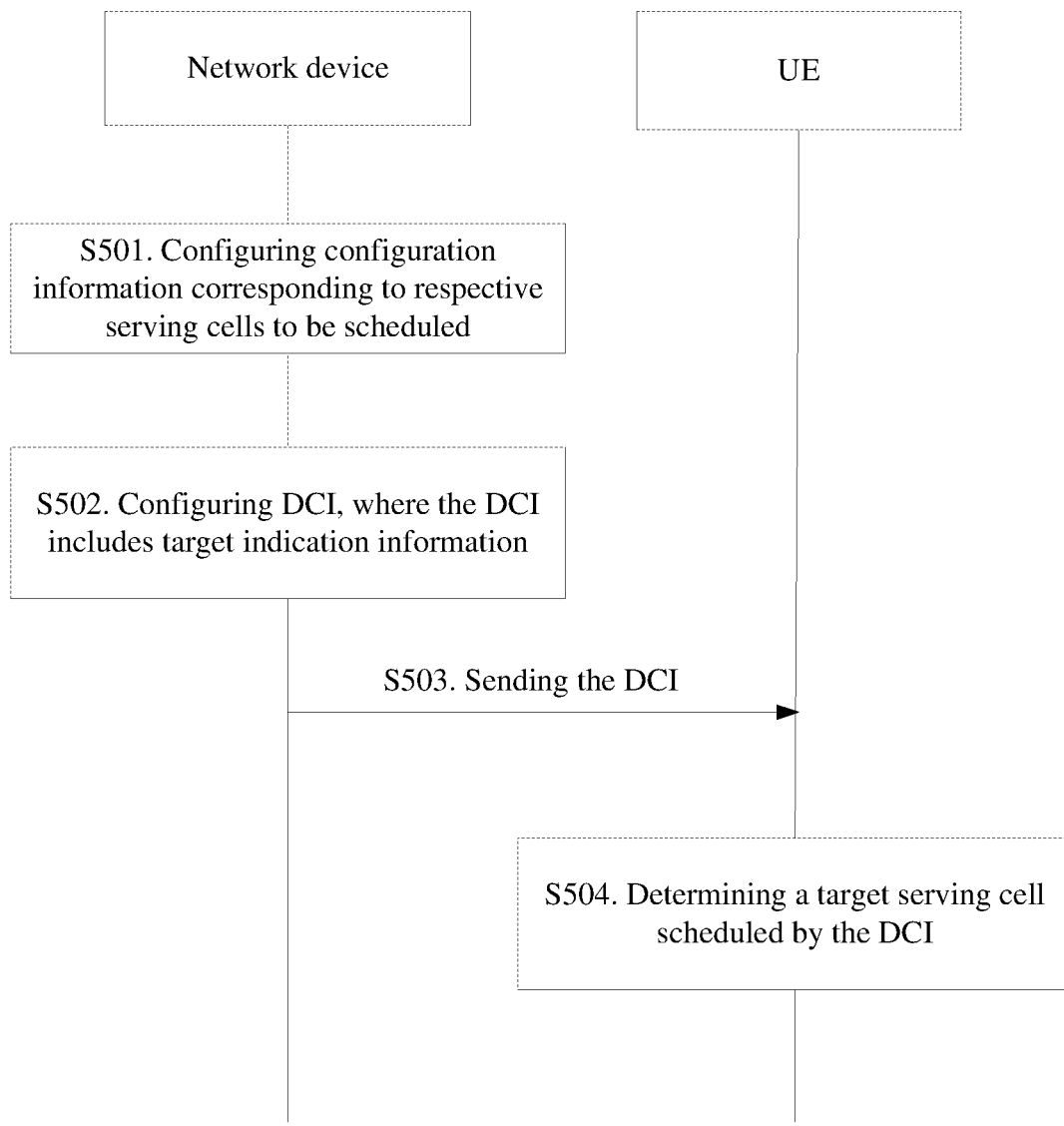
FIG. 5 is a schematic signaling diagram of a method for identifying downlink control information provided in an embodiment of the present disclosure.

In order to better understand the embodiments of the present disclosure, refer to FIG. 5, which is a schematic signaling diagram of a method for identifying the downlink control information provided by an embodiment of the present disclosure. The above-mentioned method includes:

S501, a network device configures configuration information corresponding to respective serving cells to be scheduled.

S502, the network device configures DCI, where the DCI includes target indication information.

S503, the network device sends the DCI to the UE.

S504, the UE determines, according to the configuration information corresponding to the respective serving cells to be scheduled and the target indication information, a target serving cell scheduled by the DCI.

In a feasible embodiment, the configuration information corresponding to the respective serving cells to be scheduled is a CIF value set corresponding to the respective serving cells to be scheduled. The above-mentioned target indication information is the target CIF value configured in the above-mentioned DCI. When a primary cell among the respective serving cells to be scheduled is the target serving cell, the target CIF value does not belong to the CIF value set corresponding to the respective serving cells to be scheduled. When at least one serving cell to be scheduled among the respective serving cells to be scheduled is a target serving cell, the target CIF value belongs to the CIF value set corresponding to at least one serving cell to be scheduled among the respective serving cells to be scheduled.

In another feasible embodiment, the configuration information corresponding to the respective serving cells to be scheduled is a correspondence between respective CIF value and the respective serving cells to be scheduled. The above-mentioned target indication information is the target CIF value configured in the above-mentioned DCI; the serving cell to be scheduled corresponding to the above-mentioned target CIF value is the target serving cell.

In yet another feasible embodiment, the configuration information corresponding to the respective serving cells to be scheduled is bitmap information corresponding to the respective serving cells to be scheduled. The above-mentioned target indication information is the bitmap value corresponding to the bitmap information, the number of bits in the bitmap value is the same as the number of the respective serving cells to be scheduled, and one bit in the bitmap value corresponds to one serving cell to be scheduled among the respective serving cells to be scheduled. The serving cell to be scheduled corresponding to the bit with a value of 1 in the above bitmap value is the target serving cell.

In yet another feasible embodiment, the configuration information corresponding to the respective serving cells to be scheduled is a search space list corresponding to the respective serving cells to be scheduled. The above target indication information is a corresponding target search space identifier when the above-mentioned DCI is sent to the UE, and the serving cell to be scheduled corresponding to the search space list to which the target search space identifier belongs is the target serving cell.

In another feasible embodiment, the above-mentioned target indication information further includes the target CIF value configured in the above-mentioned DCI. When the target CIF value is associated with one serving cell to be scheduled, the serving cell to be scheduled associated with the target CIF value is the target serving cell; when the target CIF value is associated with two or more serving cells to be scheduled, the serving cell to be scheduled corresponding to the search space list to which the target search space identifier belongs is the target serving cell.

It can be understood that, for the method for identifying the downlink control information described in the above-mentioned embodiments, reference may be made to the descriptions of the respective embodiments in the above-mentioned method for identifying the downlink control information applied to the UE, and details are not repeated here.

Figure 6:
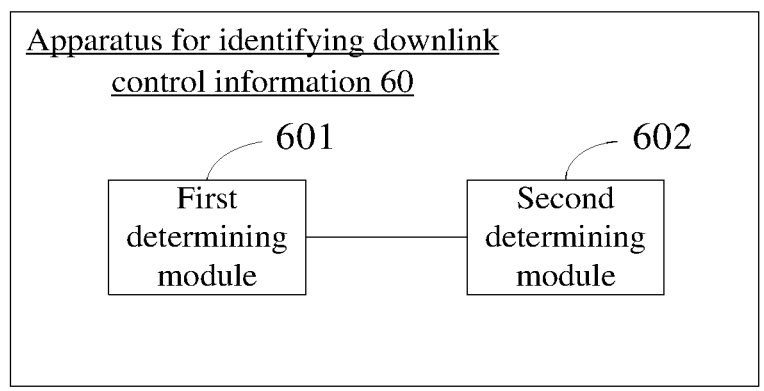
FIG. 6 is a schematic diagram of a program module of an apparatus for identifying downlink control information provided in an embodiment of the present disclosure.

Further, based on the content described in the above embodiments, the embodiments of the present disclosure also provide an apparatus for identifying downlink control information, which is applied to a UE. Referring to FIG. 6, which is a schematic diagram of a program module of an apparatus for identifying the downlink control information provided in an embodiment of the present disclosure, the apparatus for identifying the downlink control information 60 includes:

a first determining module 601, configured to determine target indication information corresponding to DCI sent by a network device; and a second determining module 602, configured to determine, according to the configuration information corresponding to respective serving cells to be scheduled and the target indication information, a target serving cell scheduled by the DCI.

The apparatus for identifying the downlink control information provided by the embodiment of the present disclosure can enable the UE to accurately identify, based on the target indication information corresponding to the DCI and the configuration information corresponding to the respective serving cells to be scheduled, the target serving cell scheduled by the DCI.

In a feasible implementation manner, the first determining module 601 is further configured to determine configuration information corresponding to the respective serving cells to be scheduled.

In an embodiment, the configuration information corresponding to the respective serving cells to be scheduled is a carrier indication field CIF value set corresponding to the respective serving cells to be scheduled. The target indication information is the target CIF value configured in the DCI, and the second determining module 602 is specifically configured to:

based on that the target CIF value does not belong to the CIF value set corresponding to the respective serving cells to be scheduled, determining the primary cell among the respective serving cells to be scheduled as the target serving cell;

based on that the target CIF value belongs to the CIF value set corresponding to at least one serving cell to be scheduled among the respective serving cells to be scheduled, determining the serving cell to be scheduled corresponding to the CIF value set to which the target CIF value belongs as the target serving cell.

In an embodiment, the configuration information corresponding to the respective serving cells to be scheduled is a correspondence between respective CIF value and the respective serving cells to be scheduled. The target indication information is the target CIF value configured in the DCI, and the second determining module 602 is specifically configured to: search the correspondence between the respective CIF values and the respective serving cells to be scheduled, and determine the serving cell to be scheduled corresponding to the target CIF value as the target serving cell.

In an embodiment, the configuration information corresponding to the respective serving cells to be scheduled is bitmap information corresponding to the respective serving cells to be scheduled. The target indication information is a bitmap value corresponding to the bitmap information, and the number of bits in the bitmap value is the same as the number of the respective serving cells to be scheduled, and one bit in the bitmap value corresponds to one serving cell to be scheduled among the respective serving cells to be scheduled, the second determining module 602 is specifically configured to: determine the serving cell to be scheduled corresponding to the bit with a value of 1 in the bitmap value as the target serving cell.

In an embodiment, the configuration information corresponding to the respective serving cells to be scheduled is a search space list corresponding to the respective serving cells to be scheduled. The target indication information is a corresponding target search space identifier when the UE receives the DCI, and the second determining module 602 is specifically configured to: determine a serving cell to be scheduled corresponding to a search space list to which the target search space identifier belongs as the target serving cell.

In an embodiment, the target indication information further includes the target CIF value configured in the DCI, and the second determining module 602 is specifically configured to:

determining a serving cell to be scheduled associated with the target CIF value;

based on that the target CIF value is associated with one serving cell to be scheduled, determining the serving cell to be scheduled associated with the target CIF value as the target serving cell;

based on that the target CIF value is associated with two or more serving cells to be scheduled, determining the serving cell to be scheduled corresponding to the search space list to which the target search space identifier belongs as the target serving cell.

In an embodiment, the second determining module 602 is further configured to: based on existing two or more target serving cells, determine that the DCI includes resource scheduling information of two or more serving cells to be scheduled.

It can be understood that the implementation principle and manner of the apparatus for identifying the downlink control information 60 are the same as the implementation principle and manner of the method for identifying the downlink control information described in FIG. 2. The description of the embodiment is not repeated here.

Further, based on the content described in the above-mentioned embodiments, an embodiment of the present disclosure provides an apparatus for identifying downlink control information, which is applied to network device, and the apparatus includes:

a sending module, configured to send DCI to a user equipment UE, where the DCI includes target indication information corresponding to the DCI, and the target indication information is used to instruct the UE to determine, according to configuration information corresponding to respective serving cells to be scheduled and the target indication information, a target serving cell scheduled by the DCI.

In a feasible implementation manner, the sending module is further configured to: send the configuration information corresponding to the respective serving cells to be scheduled to the UE.

It can be understood that the above-mentioned apparatus for identifying the downlink control information and the method for identifying downlink control information described in the above-mentioned embodiments have the same implementation principles and methods, and can refer to the above-mentioned method for identifying the downlink control information applied to UE or network device. The description of each embodiment in the method will not be repeated here.

Further, based on the content described in the foregoing embodiments, an embodiment of the present disclosure further provides a user equipment, the user equipment includes at least one processor and a memory; where the memory stores computer execution instructions; the above-mentioned at least one processor executes the computer-executed instructions stored in the memory to implement the content described in each embodiment of the above-mentioned method for identifying the downlink control information applied to the UE.

Further, based on the content described in the foregoing embodiments, an embodiment of the present disclosure further provides a network device, the network device includes at least one processor and a memory; where the memory stores computer execution instructions; the above-mentioned at least one processor executes the computer-executed instructions stored in the memory to implement the content described in each embodiment of the above-mentioned method for identifying the downlink control information applied to the network device.

The user equipment and network device provided in this embodiment can be used to implement the technical solutions of the foregoing method embodiments, and the implementation principles and technical effects therebetween are similar, and details are not described herein again in this embodiment.

Figure 7:
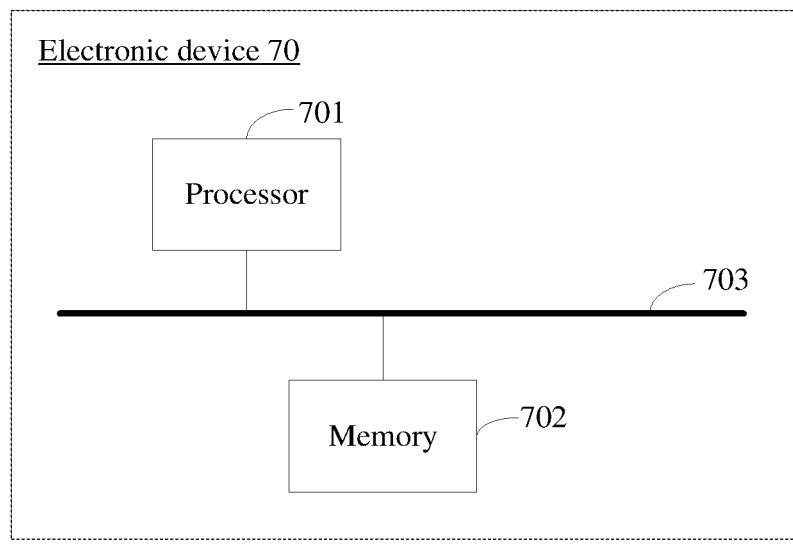
FIG. 7 is a schematic diagram of a hardware structure of an electronic device provided in an embodiment of the present disclosure.

For a better understanding of the embodiment of the present disclosure, refer to FIG. 7, which is a schematic diagram of a hardware structure of an electronic device provided by an embodiment of the present disclosure. The electronic device may be the above-mentioned user equipment, or may be the above-mentioned network device.

As shown in FIG. 7, the electronic device 70 of an embodiment includes: a processor 701 and a memory 702; where the memory 702 is configured to store computer-executed instructions;

the processor 701 is configured to execute the computer-executed instructions stored in the memory, enabling the implementation of the steps executed by the user equipment in the foregoing embodiments.

Alternatively, the processor 701 is configured to execute the computer-executed instructions stored in the memory, enabling the implementation of the steps executed by the network device in the foregoing embodiment.

For details, refer to the relevant descriptions in the foregoing method embodiments.

In an embodiment, the memory 702 may be independent or integrated with the processor 701.

When the memory 702 is provided independently, the device further includes a bus 703 for connecting the memory 702 and the processor 701.

Embodiments of the present disclosure provide a computer-readable storage medium, where computer-executable instructions are stored in the computer-readable storage medium, and when a processor executes the computer-executable instructions, enabling the implementation of the steps executed by the user equipment in the foregoing embodiments.

Embodiments of the present disclosure further provide a computer-readable storage medium, where computer-executable instructions are stored in the computer-readable storage medium, and when a processor executes the computer-executable instructions, enabling the implementation of the steps executed by the network device in the foregoing embodiments.

In the several embodiments provided in this disclosure, it should be understood that the disclosed device and method may be implemented in other manners. For example, the device embodiments described above are only illustrative. For example, the division of the modules is only a logical function division. In actual implementation, there may be other division methods. For example, multiple modules may be combined or integrated to another system, or some features can be ignored, or not implemented. On the other hand, the shown or discussed mutual coupling or direct coupling or communication connection may be through some interfaces, indirect coupling or communication connection of apparatuses or modules, and may be in electrical, mechanical or other forms.

The modules described as separate components may or may not be physically separated, and components shown as modules may or may not be physical units, that is, may be located in one place, or may be distributed to multiple network units. Some or all of the modules may be selected according to actual needs to achieve the purpose of the solution in this embodiment.

In addition, each functional module in each embodiment of the present disclosure may be integrated in one processing unit, or each module may exist physically alone, or two or more modules may be integrated in one unit. The units formed by the above modules can be implemented in the form of hardware, or can be implemented in the form of hardware plus software functional units.

The above-mentioned integrated modules implemented in the form of software functional modules may be stored in a computer-readable storage medium. The above-mentioned software function modules are stored in a storage medium, and include several instructions to enable a computer device (which may be a personal computer, a server, or a network device, etc.) or a processor to execute part steps of the method described in embodiments of the present disclosure.

It should be understood that the above-mentioned processor may be a central processing unit (CPU), and can also be other general-purpose processors, digital signal processors (DSP), disclosure-specific integrated circuits (ASIC) and so on. A general purpose processor may be a microprocessor or the processor may be any conventional processor or the like. The steps of the method disclosed in conjunction with the disclosure can be directly embodied as executed by a hardware processor, or executed by a combination of hardware and software modules in the processor.

The memory may include high-speed RAM memory, and may also include non-volatile storage NVM, such as at least one magnetic disk memory, and may also be a U disk, a removable hard disk, a read-only memory, a magnetic disk or an optical disk, and the like.

The bus may be an industry standard architecture (ISA) bus, a peripheral component (PCI) bus, or an extended industry standard architecture (EISA) bus, or the like. The bus can be divided into an address bus, a data bus, a control bus and so on. For convenience of representation, the buses in the drawings of the present disclosure are not limited to only one bus or one type of bus.

The above storage medium can be implemented by any type of volatile or non-volatile storage devices or combinations thereof, such as a static random access memory (SRAM), an electrically erasable programmable read-only memory (EEPROM), an erasable except programmable read-only memory (EPROM), a programmable read-only memory (PROM), a read-only memory (ROM), a magnetic memory, a flash memory, a magnetic disk or an optical disk. A storage medium can be any available medium that can be accessed by a general purpose or special purpose computer. An exemplary storage medium is coupled to the processor, such that the processor can read information from, and write information to, the storage medium. Of course, the storage medium can also be an integral part of the processor. The processor and the storage medium may be located in application specific integrated circuits (ASIC). Of course, the processor and the storage medium may also exist in the electronic device or the host device as discrete components.

Those of ordinary skill in the art can understand that all or part of the steps of implementing the above method embodiments may be completed by program instructions related to hardware. The aforementioned program can be stored in a computer-readable storage medium. When the program is executed, the steps including the above method embodiments are executed; and the foregoing storage medium includes: an ROM, an RAM, a magnetic disk or an optical disk and other media that can store program codes.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the scope of the technical solutions of embodiments of the present disclosure.

The invention claimed is:

1. A method for identifying downlink control information (DCI), applied to a user equipment (UE), the method comprises:
   determining configuration information corresponding to respective serving cells to be scheduled;
   determining target indication information corresponding to the DCI sent by a network device; and
   determining, according to the configuration information corresponding to the respective serving cells to be scheduled and the target indication information, a target serving cell scheduled by the DCI;

wherein the configuration information corresponding to the respective serving cells to be scheduled is bitmap information corresponding to the respective serving cells to be scheduled;

wherein the target indication information is a bitmap value corresponding to the bitmap information, and the number of bits in the bitmap value is the same as the number of the respective serving cells to be scheduled, and one bit in the bitmap value corresponds to one serving cell to be scheduled among the respective serving cells to be scheduled, the determining, according to the configuration information corresponding to the respective serving cells to be scheduled and the target indication information, the target serving cell scheduled by the DCI comprises:

determining a serving cell to be scheduled corresponding to a bit with a value of 1 in the bitmap value as the target serving cell.

2. The method according to claim 1, further comprising:
based on existing two or more the target serving cells, determining that the DCI comprises resource scheduling information of two or more serving cells to be scheduled.

3. A user equipment, comprising: at least one processor and a memory;

the memory stores computer-executable instructions;

the at least one processor executes the computer-executable instructions stored in the memory, enabling the user equipment to:

determine configuration information corresponding to respective serving cells to be scheduled;

determine target indication information corresponding to downlink control information (DCI) sent by a network device; and determine, according to the configuration information corresponding to the respective serving cells to be scheduled and the target indication information, a target serving cell scheduled by the DCI;

wherein the configuration information corresponding to the respective serving cells to be scheduled is bitmap information corresponding to the respective serving cells to be scheduled;

wherein the target indication information is a bitmap value corresponding to the bitmap information, and the number of bits in the bitmap value is the same as the number of the respective serving cells to be scheduled, and one bit in the bitmap value corresponds to one serving cell to be scheduled among the respective serving cells to be scheduled, the at least one processor executes the computer-executable instructions stored in the memory, enabling the user equipment further to:

determine a serving cell to be scheduled corresponding to a bit with a value of 1 in the bitmap value as the target serving cell.

4. A non-transitory computer-readable storage medium, wherein computer-executable instructions are stored in the computer-readable storage medium, and when a processor executes the computer-executable instructions, enabling the processor to:

determine configuration information corresponding to respective serving cells to be scheduled;

determine target indication information corresponding to downlink control information (DCI) sent by a network device; and determine, according to the configuration information corresponding to the respective serving cells to be scheduled and the target indication information, a target serving cell scheduled by the DCI;

wherein the configuration information corresponding to the respective serving cells to be scheduled is bitmap information corresponding to the respective serving cells to be scheduled;

wherein the target indication information is a bitmap value corresponding to the bitmap information, and the number of bits in the bitmap value is the same as the number of the respective serving cells to be scheduled, and one bit in the bitmap value corresponds to one serving cell to be scheduled among the respective serving cells to be scheduled, and when the processor executes the computer-executable instructions, enabling the processor further to:

determine a serving cell to be scheduled corresponding to a bit with a value of 1 in the bitmap value as the target serving cell.

* * * * *